Patented Apr. 18, 1933

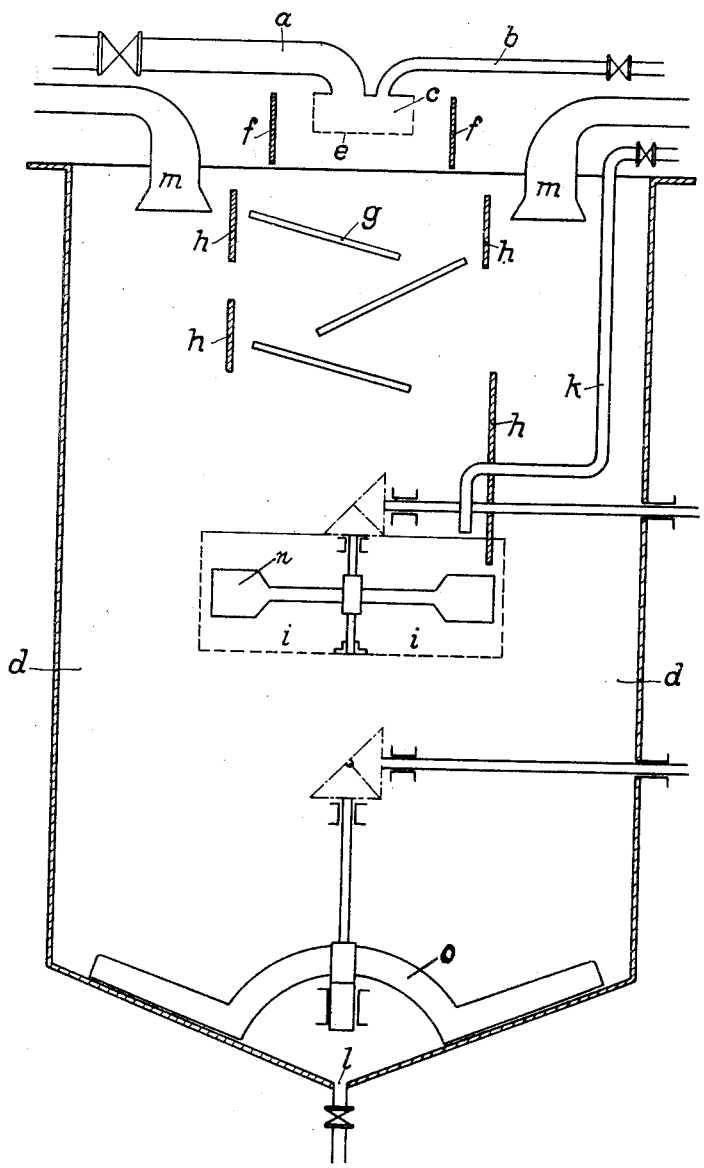

1,904,021

UNITED STATES PATENT OFFICE

HERMANN WEBER, OF DUSSELDORF, AND WILHELM PAPE, OF BENRATH-ON-THE-RHINE, GERMANY, ASSIGNORS TO THE FIRM HENKEL & CIE GESELLSCHAFT MIT BESCHRANKTER HAFTUNG, OF DUSSELDORF, GERMANY, A CORPORATION OF GERMANY

APPARATUS FOR PRODUCING SOAPS

Application filed July 16, 1929, Serial No. 378,735, and in Germany August 6, 1928.

The usual method of producing soaps from fatty acids by the decomposition of fat, consists in leading charges of the fatty acids into boilers in which the acids are treated with a sufficient amount of a carbonate of alkali (for instance carbonate of sodium) to effect the saponification. Fatty acids of this kind usually contain some neutral fat (triglycerids of fatty acids), and when the fatty acids have been converted into soap this neutral fat is saponified by means of caustic alkali at a separate stage of the process.

It is an object of the present invention to convert fatty acids into soap by means of a continuous process and in a manner, which from an economical point of view is very advantageous. Our method is equally applicable to fatty acids of 100 per cent strength and to mixtures of fatty acids and neutral fats, such as are obtained by the known fat-decomposition method.

According to the present invention fatty acids or fatty acid mixtures are mixed continually and intimately in a suitable part of an apparatus with a solution of a carbonate of alkali. Such quantity of carbonate of alkali is used which a calculation has shown to be sufficient for converting the fatty acids into soap. The mass is thereupon conducted through a second part of the apparatus in which the still uncovered portions of fatty acids are converted into soap, during which stage of the process heat is applied to the mass in order to remove the carbon dioxid and to evaporate the surplus of water. The reaction mass is now conducted into a third part of the apparatus into which caustic alkali is added in order to convert the neutral fat present into soap and in which the mass receives an addition of free caustic alkali sufficient to give the soap the desired strength. The caustic alkali flows continually into this third part of the apparatus in charges which are regulated according to the quantity of neutral fat present. After this treatment the soap is ready for use.

It is necessary that the fatty acids and the solution of carbonate of alkali be brought into reaction with each other continually and in equivalent amounts. This may be attained, for example, by using solutions of carbonate of alkali which are of constant concentration and by adding the fluids continually by charging devices of known construction.

If it is desired to add electrolytes, for instance water glass, to the soap, such substances should preferably be added together with one of the reaction fluids, for instance together with the solution of carbonate of alkali. Bleaching fluids, colors, fillers and other additional substances may also be incorporated into the soap in this manner.

The carbon dioxid generated during the treatment must be removed continuously by suitable means in order that the reactions may take place in the manner desired.

The supply of caustic lye is regulated in accordance with the contents of neutral fat present in the fatty acids to be treated and in accordance with the amount of free caustic alkali to be added, in order to give the soap the desired strength.

An apparatus for carrying out the described treatment is shown schematically by way of example in the accompanying drawing.

In this apparatus the continual saponification of the fatty acids takes place in the following manner:

From suitable storing receptacles and measuring devices (not shown) the fatty acid and the solution of carbonate of alkali (for instance soda solution) flow through tubes $a$ and $b$ into the mixing receptacle $c$, which is arranged at the upper end of a tower or container $d$ of relatively great width. A partial saponification will take place when the fluids meet in the receptacle $c$. The saponification in this receptacle may be promoted by means of stationary or rotary sieves or propellers of any suitable form. In the drawing a stationary cylindrical sieve $e$ is indicated.

The reaction mass as it leaves the mixing device $e$ is directed by a baffle wall $f$ into a spreading device $g$ which is equipped with suitable heating arrangements. This device comprises a plurality of heat conducting elements, which may consist, for example, of several layers of heating coils arranged crosswise, interiorly heated double sheets or the like. In this device the reaction mass is further heated to finish the saponification of fatty acids to drive out the carbon dioxid and to evaporate the surplus of water. The reaction mass when leaving the sieve $e$ is directed by a baffle wall $h$ over the heating or spreading elements $g$ and is thus prevented from flowing off laterally.

When the reaction mass leaves the spreading and heating device $g$ it is of relatively solid nature so that it cannot be pumped and is mixed with neutral fat. In this state the mass flows into a device $i$ in which, during each unit of time, such an amount of caustic alkali lye is added to it as will effect the saponification of the neutral fat and give the soap the desired strength. The device $i$ may be constructed in the same manner as the heating device $g$ or may, as shown in the drawing, consist of a casing-shaped sieve of any desired form in which sieve a stirring mechanism $n$ operates. Measured quantities of caustic alkali lye are continuously sprayed on the reaction mass in the device $i$ through the tube $k$.

When the finished soap leaves the sieve $i$ it descends to the lower end of the container $d$ from which it is pumped off continuously through the outlet $l$. A stirring device $o$ in the lower end of the container $d$ keeps the soap in motion and prevents the same from sticking to the walls of the container.

The carbon dioxid which is produced during the saponification and the escaping water vapor are removed through the suction tubes $m$ by means of an exhauster or the like.

In most cases it is advantageous to preheat the fluids which are fed into the apparatus.

The new method makes it possible to produce a given amount of soap by means of devices which are simpler and require less space than the devices hitherto known. Further the time of operation is considerably shortened and great savings in steam, power and caustic alkali lye are effected.

It should of course be understood, that the invention is not restricted to the example shown and described and that it may be modified to better adapt it to varying conditions and within the scope and spirit of the appended claims.

We claim:

1. An apparatus for continuously converting fatty acids and mixtures of fatty acids and neutral fats into soap, comprising a main container, means above said container to receive and mix the fatty acids with an amount of a solution of alkali metal carbonate necessary to effect the saponification and to deliver such mixture to the main container, means for continually feeding fatty acids or mixtures of fatty acids and neutral fats and a solution of alkali metal carbonate to the said mixing means, heating means in the upper part of the main container below said mixing means by which the unconverted portions of the fatty acids are saponified, the residual carbon dioxid is driven out and the excess of water is evaporated, means in the main container below the heating means for adding caustic alkali lye to the reaction mass, means at the upper part of said container for removing the liberated carbon dioxid and water vapor from the container and means at the lower end of the main container for drawing off the soap continually from the container.

2. An apparatus for continuously converting fatty acids and mixtures of fatty acids and neutral fats into soap, comprising a main container, means above said container to receive and mix the fatty acids with an amount of a solution of alkali metal carbonate necessary for performing the saponification and to deliver such mixture to the main container, means for continually feeding the fatty acids or the mixtures of fatty acids and neutral fats and the solution of alkali metal carbonate to the said mixing means, means comprising several layers of heating coils arranged crosswise of said main container below said mixing means by which the unconverted portions of the fatty acids are saponified, the residual carbon dioxid is driven out and the undesired excess of water is evaporated, a second mixing means in the main container below the heating device for adding caustic alkali lye to the reaction mixture, means at the upper part of the main container for removing the liberated carbon dioxid and water vapor from the container and means at the lower end of the main container for continuously drawing off the soap from the main container.

3. An apparatus for continuously converting fatty acids and mixtures of fatty acids and neutral fats into soap, comprising a main container, means above said container to receive and mix the fatty acids with an amount of a solution of alkali metal carbonate necessary for performing the saponification and delivering such mixture to the main container, means for continually feeding fatty acids or mixtures of fatty acids and neutral fats and a solution of alkali metal carbonate to the said mixing means, means comprising several layers of heating coils arranged crosswise of said main container below said mixing means which the unconverted portions of the fatty acids are saponified, the residual carbon dioxid is driven out and the undesired excess of water is evaporated, a second mixing means located in the main container below the heating coils adding caustic alkali lye to the reaction mixture, suction tubes at the upper part of said container for removing the liberated carbon dioxid and water vapor from the container, a stirring device at the lower end of the main container and means for drawing off the soap continually from the lower part of the container.

In testimony whereof we have hereunto set our hands.

HERMANN WEBER.
WILHELM PAPE.